UNITED STATES PATENT OFFICE.

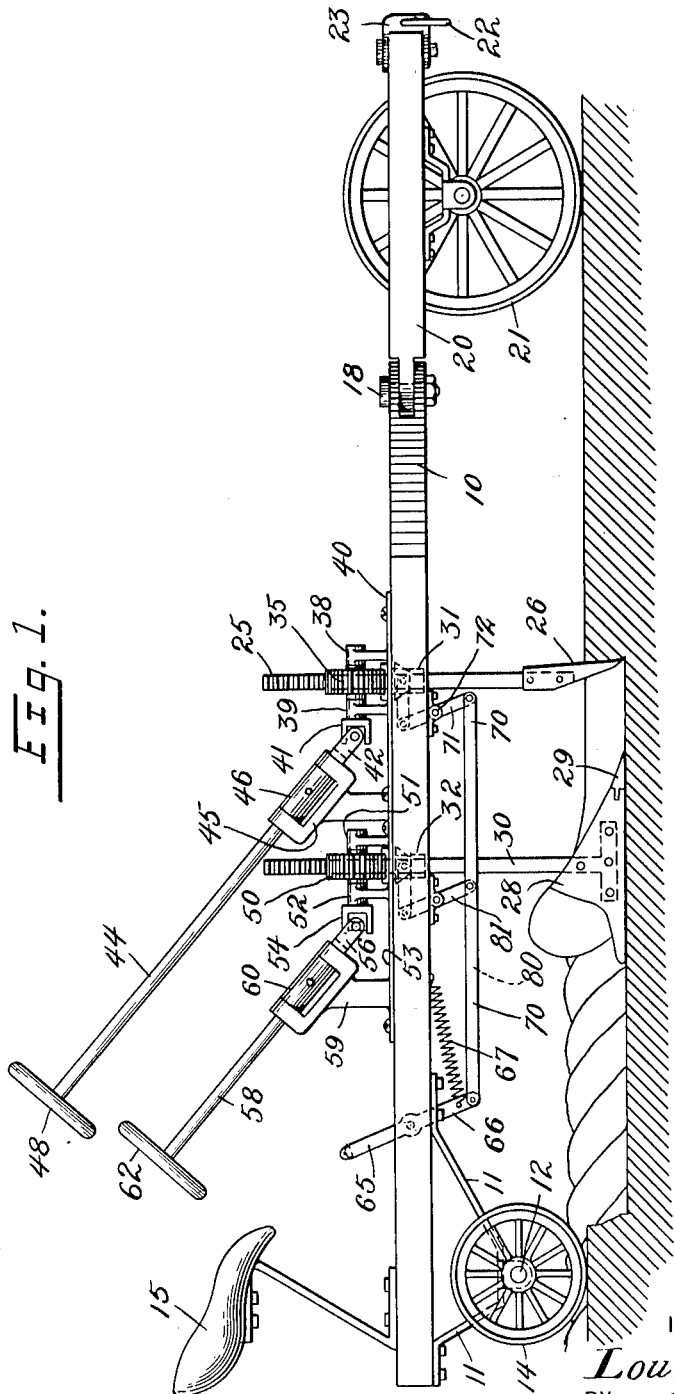

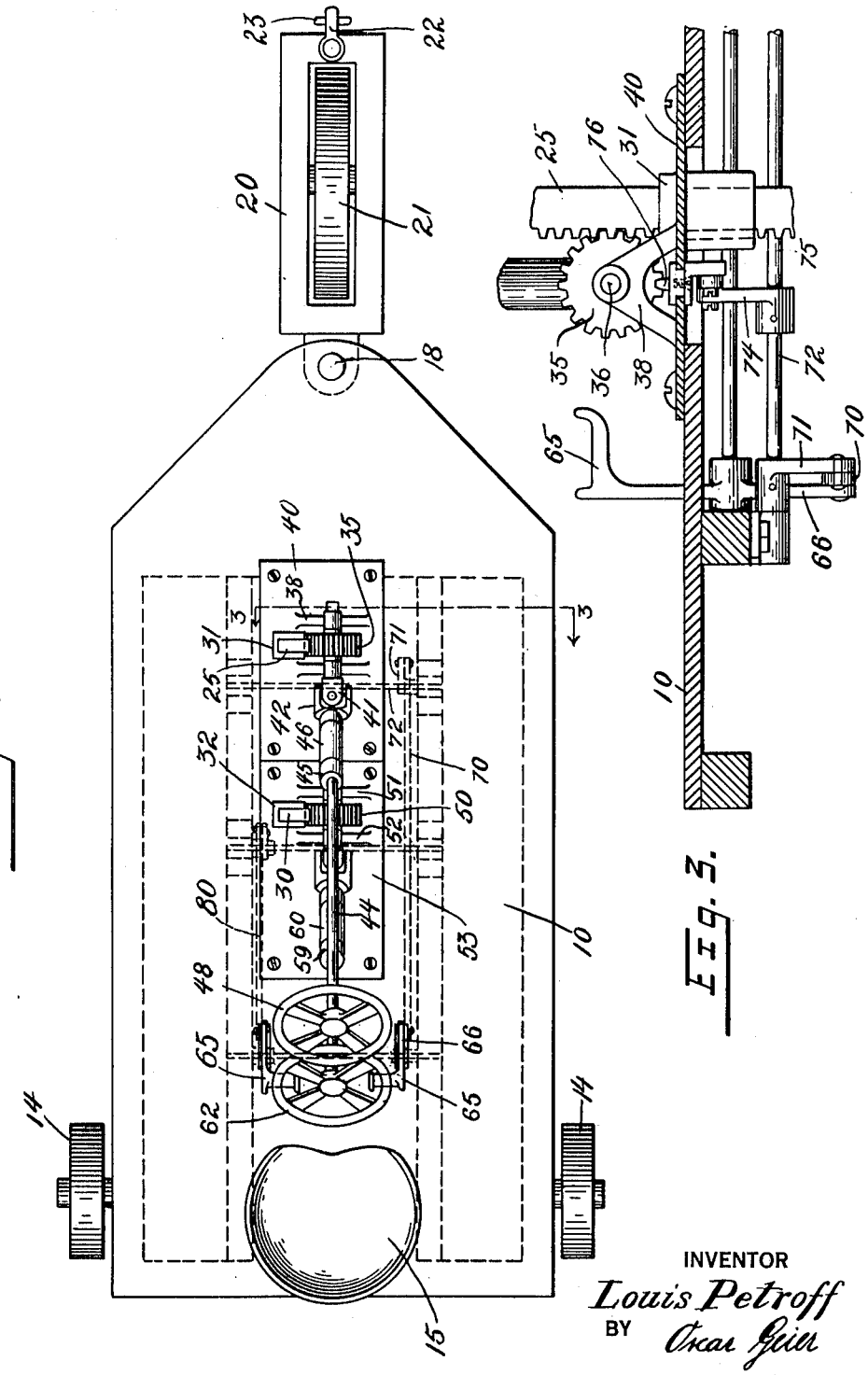

LOUIS PETROFF, OF TYLER, PENNSYLVANIA.

PLOW.

1,309,693.

Specification of Letters Patent.   Patented July 15, 1919.

Application filed March 23, 1918.   Serial No. 224,276.

*To all whom it may concern:*

Be it known that I, LOUIS PETROFF, a citizen of Russia, resident of Tyler, county of Clearfield, and State of Pennsylvania, have invented certain new and useful Improvements in Plows, of which the following is a specification.

This invention relates to improvements in agricultural implements and particularly to those known as plows.

The principal object of the invention is to provide a plow in which the colters and plow shares are readily adjustable by the operator at different working heights.

A further object is to provide means whereby the plow share and colter may be locked when adjusted at any given distance relative to the frame.

A still further object is to provide a plow in which all the several operative parts are controlled by handles accessible to a driver, mounted by a seat carried by the upper part of the apparatus.

These and other like objects are attained by the novel construction and combination of parts hereinafter described and shown in the accompanying drawing, forming a material part of this disclosure, and in which:—

Figure 1 is a side elevational view of a plow made in accordance with the invention and indicating its application.

Fig. 2 is a top plan view thereof, and

Fig. 3 is an enlarged fragmentary transverse sectional view taken on line 3—3 of Fig. 2.

In carrying out the invention use is made of a rigid, substantially rectangular, platform 10, mounted at the rear end on brackets 11, in which is a shaft 12, having relatively broad faced wheels 14 at its end, by means of which it is supported.

Over the axle is a driver's seat 15, centrally of the platform, the front edges of which are beveled toward a common center in which is secured a bolt 18, the same acting as a pivotal connection for a frame 20, in which the front wheel 21, is rotatably mounted and the extreme front end of the frame 20, is provided with a clevis 23, carrying a ring 22, engageable with the motive power of the apparatus.

Substantially central of the platform and toward the front end thereof is a vertical bar 25, provided with rack teeth upon its inner edge, the lower end of the bar extending downward toward the ground and having rigidly secured upon it a colter or turf knife 26, adapted to cut the soil in advance of the plow share 28, having a hardened point 29, and mounted rigidly upon the lower end of a bar 30, provided with rack teeth at its upper end, which extends through the platform 10, both bars 25 and 30, being slidably engaged in rigid guides 31 and 32 securely fixed in the platform 10.

Engaging with the rack bar 25 is a spur gear 35 mounted on a shaft 36, housed in brackets 38 and 39, formed with a plate 40, rigidly engaged with the upper surface of the platform.

The rearward extending end of the shaft 36, has formed with it one of the elements 41, of a universal joint, the other element 42 of which is fixed upon the end of an angularly disposed shaft 44, mounted in a bracket 45, the shaft being held against longitudinal movement by reason of a fixed collar 46, and may be operated by a hand wheel 48, secured to its upper end convenient to an operator resting upon the seat 15. Thus by turning the handle 48, the colter 26 may be raised or lowered with reference to the platform and the soil below.

In a similar manner, a spur gear 50, is engaged with the teeth of the rack bar 30, the gear being mounted upon a shaft similar to that described, journaled in brackets 51 and 52, formed with the plate 53, the shaft having upon its end one element 54, of a universal joint, the corresponding element 56 being secured upon the lower end of a similarly inclined shaft 58, mounted in a bracket 59, provided with a fixed collar 60, and a hand wheel 62, the same being disposed substantially below the hand wheel 48, so that either or both can be operated conveniently, rotary motion communicated through the hand wheel 62 obviously raising the plow share 28, relative to the platform 10, or the soil below.

A pair of foot levers 65, are pivoted in the platform 10, the lower extending ends 66 being engaged by coiled tension spring 67 by means of which the lower end is drawn forward, there being also attached to one of the lever ends 66, a link 70, operatively engaged by another lever 71, fixed upon a shaft 72, having engaged upon it another lever 74, its upper end being operatively engaged with a sliding block 75, movable within a slot formed in the plate 40, and carrying a detent finger 76, engageable with the teeth of the gear 35.

Engaged with the opposite disposed link 80, is a like lever 81, moving a similar finger into or out of engagement with the gear 50, so that the operator, by pressing his feet forward, may release the detents from their engagement with the spur gears permitting the handles 48 and 62 to be manually operated, raising or lowering the colter or plow share, one independently of the other, to any desired degree, whereupon releasing the feet from the levers 65, the springs 67 cause the detents to again engage with the teeth of the gears holding them in a rigid locked position and maintaining the colter and the plow share at any desired position relative to the surface of the soil.

From the foregoing it will be seen that a very convenient and effective device has been disclosed, permitting the colter or the plow share to be operated at any given depth and that all of the several movements are readily controlled by an operator without leaving his seat.

Having thus described my invention what I claim as new and desire to secure by Letters Patent, is:

The combination of a wheeled platform, an implement carrying rack bar mounted to slide vertically through said platform, and an operating and locking mechanism therefor comprising a spur gear in engagement with said rack bar, a shaft for said spur gear, a bracket, an angularly disposed shaft mounted in said bracket, a universal joint having one of its elements formed with the spur gear shaft, a fixed collar in said bracket for holding the angularly disposed shaft against longitudinal movement, means for operating said shaft, a detent engageable with the teeth of said spur gear, and means for operating said detent.

In testimony whereof I have affixed my signature.

LOUIS PETROFF.